(12) United States Patent
Ichihara et al.

(10) Patent No.: US 7,278,938 B2
(45) Date of Patent: Oct. 9, 2007

(54) POWER TRANSMISSION DEVICE

(75) Inventors: Takahiro Ichihara, Kashiwara (JP); Hajime Watanabe, Kashiwara (JP); Hideki Fujiwara, Kitakatsuragi-gun (JP); Minoru Mera, Kariya (JP); Taku Adaniya, Kariya (JP); Akinobu Kanai, Kariya (JP); Naoki Usui, Kariya (JP); Tomoharu Arai, Kariya (JP)

(73) Assignee: Koyo Seiko Co., Ltd., Osaka (JP)

( * ) Notice: Subject to any disclaimer, the term of this patent is extended or adjusted under 35 U.S.C. 154(b) by 602 days.

(21) Appl. No.: 10/786,618

(22) Filed: Feb. 26, 2004

(65) Prior Publication Data

US 2004/0180742 A1    Sep. 16, 2004

(30) Foreign Application Priority Data

Feb. 28, 2003   (JP) .............................. 2003-053757

(51) Int. Cl.
F16H 63/00 (2006.01)
F16H 53/00 (2006.01)
F16D 41/46 (2006.01)
F16D 3/34 (2006.01)

(52) U.S. Cl. ..................... 474/70; 474/199; 192/48.92; 192/45

(58) Field of Classification Search ................. 474/70; 301/75 R, 76–78; 417/17, 645, 299, 222, 417/310; 62/236; 192/48.92, 45, 11 B
See application file for complete search history.

(56) References Cited

U.S. PATENT DOCUMENTS 6,234,769 B1 *  5/2001  Sakai et al. .................. 417/374
6,617,727 B2 *  9/2003  Iwasa et al. ............... 310/75 R
6,640,948 B2 * 11/2003  Shirataki et al. ............... 192/45
6,993,910 B2 *  2/2006  Iwanami et al. ............... 60/645
7,007,781 B2 *  3/2006  Ichihara et al. .......... 192/48.92
7,056,247 B2    6/2006  Fujiwara
7,143,881 B2   12/2006  Ichihara
2002/0157413 A1 * 10/2002  Iwanami et al. ............... 62/236
2003/0017899 A1    1/2003  Fujiwara et al.
2003/0103848 A1 *  6/2003  Hayashi ....................... 417/212
2003/0141161 A1 *  7/2003  Ouchi .......................... 192/45
2004/0178040 A1    9/2004  Ichihara

FOREIGN PATENT DOCUMENTS

| DE | 10317522 A1 * | 11/2003 | |
|---|---|---|---|
| EP | 1 243 448 A1 | 9/2002 | |
| EP | 1 316 452 A2 | 6/2003 | |
| JP | 05-60153 A * | 3/1993 | .................. 192/45 |
| JP | 11-93876 A | 4/1999 | |
| JP | 2000-274456 A * | 10/2000 | |
| JP | 2001-32907 A | 2/2001 | |
| JP | 2001-140757 A * | 5/2001 | |
| JP | 2001140757 | 5/2001 | |

* cited by examiner

Primary Examiner—Marcus Charles
(74) Attorney, Agent, or Firm—Nixon & Vanderhye, P.C.

(57) ABSTRACT

A power transmission device includes a first one-way clutch that transmits a rotational power of a pulley to a rotating shaft, and a second one-way clutch that transmits a rotational power of a rotor of a motor to the rotating shaft. The first one-way clutch is of inner cam type in which an engagement cam-surface is formed in an outer periphery of a first inner ring, while the second one-way clutch is of outer cam type in which an engagement cam-surface is formed in an inner periphery of a second outer ring. This arrangement improves engagement performance of the first one-way clutch as well as reducing heat generation of the second one-way clutch, so that the lifetime of grease is prolonged.

3 Claims, 3 Drawing Sheets

POWER TRANSMISSION DEVICE

BACKGROUND

I. Technical Field

The present invention relates to a power transmission device which is convenient if used for connection and disconnection in power transmission between, for example, an automobile engine and an air conditioner.

II. Related Art and Other Considerations

Conventionally, as a power transmission device of this type, there is a device in which an electromagnetic clutch is provided between a pulley and a rotating shaft that drives a compressor. The electromagnetic clutch is on while an engine is rotating so that a rotational power is transmitted to the rotating shaft from the pulley. On the other hand, the electromagnetic clutch is turned off when the engine is stopped to disconnect the rotating shaft from the pulley so that the rotating shaft is driven to rotate by a motor (see JP 2001-140757 A).

However, the conventional power transmission device requires the electromagnetic clutch and a control part that controls on-off action of the electromagnetic clutch. This makes the structure of the power transmission device complicated and increases the device size.

BRIEF SUMMARY

It is an object of the present invention to provide a power transmission device that is simple in structure as well as small in size.

A power transmission device according to an example embodiment includes:

a pulley to which a rotational power is transmitted via a belt;

a motor having a rotor;

a shaft to which a rotational power of the pulley and a rotational power of the rotor are transmitted;

a first one-way clutch including an inner ring, an outer ring, and engagement members disposed between the inner ring and the outer ring, the first one-way clutch transmitting the rotational power of the pulley to the shaft when a rotational speed of the pulley is relatively higher than that of the rotating shaft; and a second one-way clutch including an inner ring, an outer ring, and engagement members disposed between the inner ring and the outer ring, the second one-way clutch transmitting the rotational power of the rotor to the shaft when the rotational speed of the rotor is relatively higher than that of the shaft, wherein, in the second one-way clutch, the inner ring has an engagement cylindrical surface in an outer periphery thereof and is rotatable together with the shaft;

the outer ring has an engagement cam-surface in an inner periphery thereof and is rotatable together with the rotor; and the engagement members are engagement rollers disposed between the engagement cylindrical surface of the inner ring and the engagement cam-surface of the outer ring.

Suppose, for example, that, in the power transmission device with the above construction, the outer ring of the first one-way clutch is connected to the pulley driven by an engine, that the outer ring of the second one-way clutch is connected to the rotor of the motor, and that the inner ring of the first one-way clutch and the inner ring of the second one-way clutch are connected to a rotating shaft of a compressor. Then, while the engine is operating, the rotational power of the pulley driven by the engine is transmitted to the rotating shaft of the compressor via the outer ring, engagement members and inner ring of the first one-way clutch, so that the rotating shaft of the compressor is rotated by the engine. During the operation of the engine, the second one-way clutch is in a disengaged state, and the inner ring of the second one-way clutch freely rotates. On the other hand, while the engine is not operating, the motor is driven so that a rotational power of the rotor of the motor is transmitted to the rotating shaft of the compressor via the outer ring, engagement members and inner ring of the second one-way clutch, whereby the rotating shaft of the compressor is rotated by the motor. While the engine is not operating, the first one-way clutch is in a disengaged state, and the inner ring of the first one-way clutch freely rotates or idles. In this way, the power transmission device is able to drive the rotating shaft of the compressor by the first and second one-way clutches both while the engine is operating and while the engine is not operating. Therefore, no electromagnetic clutch or control part therefor is required. This enables the power transmission device to be simple in structure and compact.

According to an example embodiment of the power transmission device, the second one-way clutch is made as a so-called outer cam type one-way clutch in which the engagement cam-surface is formed at the inner periphery of the outer ring and the engagement cylindrical surface is formed at the outer periphery of the inner ring. Thus, a radius of the engagement cylindrical surface of the second one-way clutch is reduced, as compared with the case where the second one-way clutch is made as a so-called inner cam type one-way clutch in which the engagement cam-surface is formed at the outer periphery of the inner ring, and the engagement cylindrical surface is formed at the inner periphery of the outer ring. That is, when the second one-way clutch is in a disengaged state, and the engagement rollers are thus in an idling state, a relative circumferential speed between the engagement cylindrical surface of the second one-way clutch and the engagement rollers, which speed is proportional to the above-mentioned radius, can be reduced by decreasing the radius. During the time in which the engine is operating, in most of which time the rotational speed of the pulley is relatively higher than that of the rotating shaft, the engagement rollers are in a sliding state on the engagement cylindrical surface. Therefore, reducing the relative circumferential speed of the engagement cylindrical surface of the second one-way clutch with respect to the engagement rollers, as mentioned above, contributes to the reduction of the heat release value due to friction between the engagement cylindrical surface and the engagement rollers. Consequently, the lifetime of grease sealed in between the outer ring and inner ring of the second one-way clutch can be prolonged.

In one embodiment, in the first one-way clutch, the inner ring has an engagement cam-surface in an outer periphery thereof and is rotatable together with the shaft, the outer ring has an engagement cylindrical surface in an inner periphery thereof and is rotatable together with the pulley, and the engagement members are engagement rollers disposed between the engagement cam-surface of the inner ring and the engagement cylindrical surface of the outer ring.

According to the power transmission device with the above construction, the first one-way clutch is made as a so-called inner cam type one-way clutch in which the engagement cam-surface is formed at the outer periphery of the inner ring, and the engagement cylindrical surface is formed at the inner periphery of the outer ring. When the first one-way clutch is in an engaged state and the engagement rollers are engaged between the engagement cylindrical surface of the inner periphery of the outer ring and the engagement cam-surface of the outer periphery of the inner ring, engagement performance between the engagement rollers and both the engagement cylindrical surface and the engagement cam-surface can be stabilized, compared with the case where the first one-way clutch is made as an outer cam type one-way clutch in which the engagement cam-surface is formed at the inner periphery of the outer ring, and the engagement cylindrical surface is formed at the outer periphery of the inner ring. That is, the engagement cylindrical surface is formed at the inner periphery of the outer ring such that the inner periphery of the outer ring is curved or concave radially outwardly. Thus, the engagement performance between the engagement cylindrical surface of the outer ring that is a concave surface and the surfaces of the engagement rollers that are convex surfaces is improved, compared with the case where the engagement cam-surface is formed at the inner periphery of the outer ring so that the inner periphery of the outer ring is made substantially planar. Therefore, during the time in which the engine is operating, in most of which time the rotational speed of the pulley is relatively higher than that of the rotating shaft, even if the pulley is rotated at a high speed and the outer ring of the first one-way clutch is rotated at a high speed accordingly, the engagement rollers are prevented from displacement from the engagement positions with the outer ring, so that the rotational power of the pulley is surely transmitted to the rotating shaft.

In one embodiment, in at least one of the first one-way clutch and the second one-way clutch, the inner ring and the outer ring are provided with raceway surfaces adjacent the engagement surfaces of the inner ring and the outer ring and balls are disposed between these raceway surfaces so that a ball bearing portion is provided.

In the power transmission device of the above embodiment, the "engagement surfaces" are defined as surfaces with which the engagement members are engaged. That is, in the case where the engagement members are engagement rollers, the engagement cylindrical surface and the engagement cam-surface are defined as the engagement surfaces. In the case where the engagement members of the first one-way clutch are sprags instead of the engagement rollers, surfaces with which the sprags are engaged are defined as the engagement surfaces.

According to the power transmission device of this embodiment, because in at least one of the first one-way clutch and the second one-way clutch, the inner ring and the outer ring are provided with raceway surfaces adjacent the engagement surfaces of the inner ring and the outer ring and balls are disposed between these raceway surfaces so that a ball bearing portion is provided, the ball bearing portion can support radial loads applied to the one-way clutch provided with the ball bearing portion. Accordingly, load resistance and durability of the one-way clutch provided with the ball bearing portion are favorably maintained.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
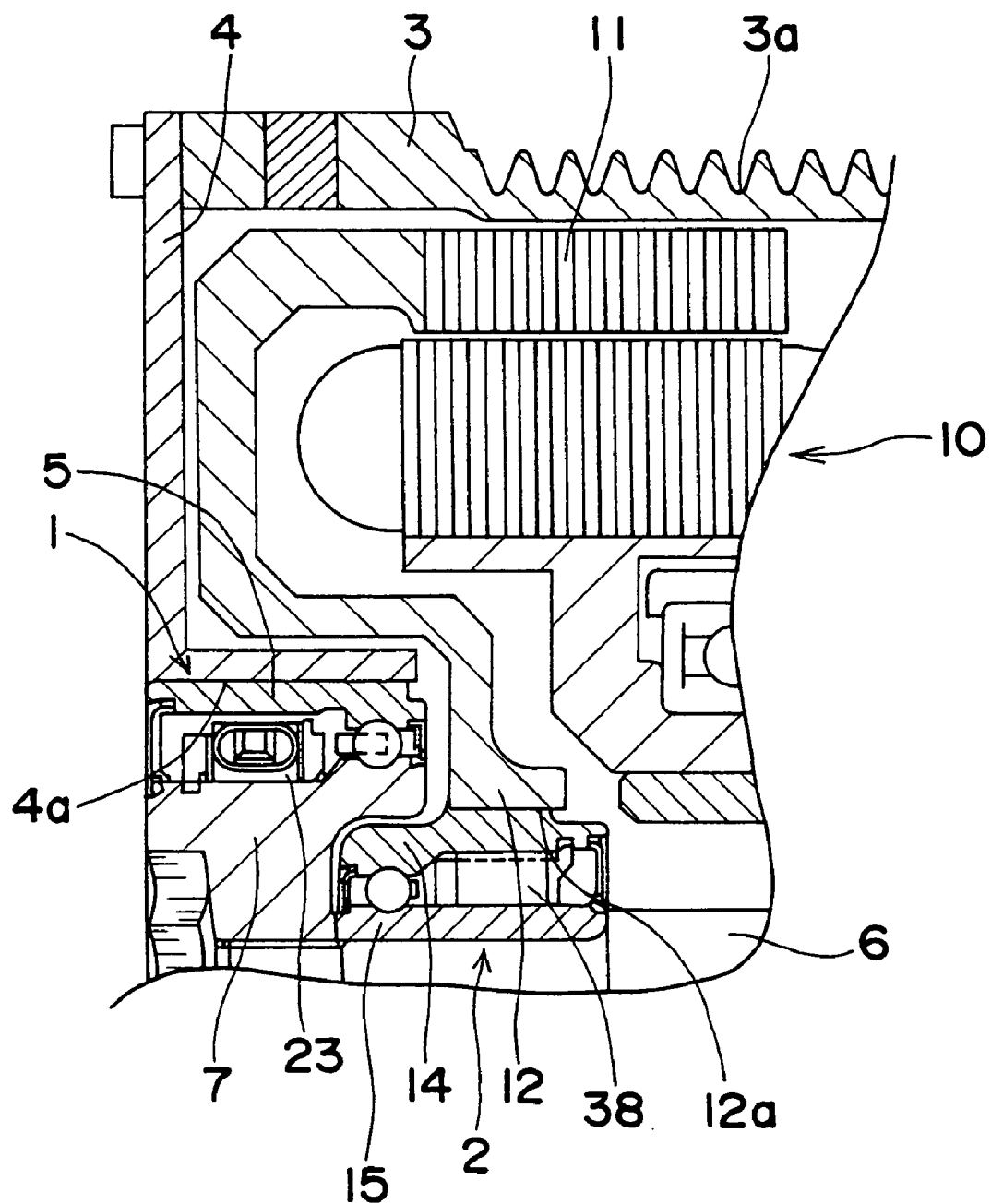
FIG. 1 is a cross section in an axial direction of one example embodiment of power transmission device.

FIG. 1 is a cross section in an axial direction of an example embodiment of the power transmission. The power transmission device includes a pulley 3, a first power-transmitting member 4, a first one-way clutch 1, a motor 10, a rotor 11, a second one-way clutch 2 and a rotating shaft 6 that is one example of a shaft to drive a compressor.

The pulley has belt-fitting grooves 3a in its outer periphery, and a belt (not shown) for transmitting a rotational power of an engine is fitted to the belt-fitting grooves 3a. The pulley 3 transmits the rotational power to the first power-transmitting member 4, which has an inner peripheral surface 4a in a radially innermost location of the member 4. A first outer ring 5 of the first one-way clutch 1 is fitted in and fixed to the inner peripheral surface 4a of the first power-transmitting member 4, so that the rotational power transmitted from the pulley 3 to the first power-transmitting member 4 is transmitted to the first one-way clutch 1. The first one-way clutch 1 also includes a first inner ring 7 to which the rotational power of the first outer ring 5 is transmitted via first engagement rollers 23, and the first inner ring 7 is engaged with a thread portion of the rotating shaft 6 in order to be fixed thereto.

The second one-way clutch 2 has a second outer ring 14 that is fitted in and fixed to an inner peripheral surface 12a of a yoke 12 of the rotor 11 so that the rotational power of the rotor 11 is transmitted to the second one-way clutch 2. The second one-way clutch 2 further includes a second inner ring 15 to which the rotational power of the second outer ring 14 is transmitted via second engagement rollers 38. An inner peripheral surface of the second inner ring 15 is fitted and fixed around the rotating shaft 6 that drives the compressor.

Figure 2:
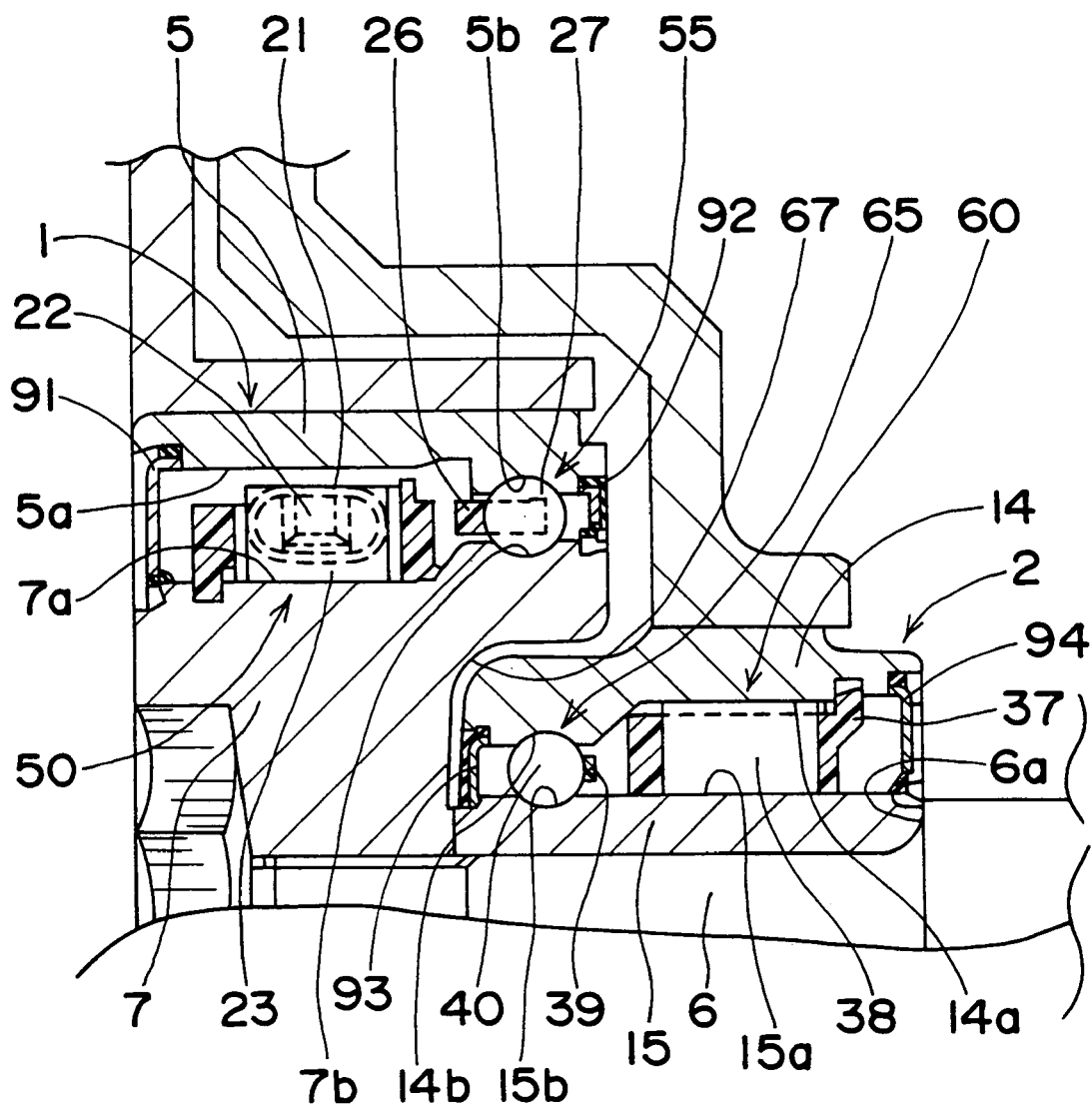
FIG. 2 is an enlarged view in the vicinity of a first and a second one-way clutch of the power transmission device of FIG. 1.

FIG. 2 is an enlarged view in the vicinity of the first one-way clutch 1 and the second one-way clutch 2. As shown in FIG. 2, the first one-way clutch 1 has a one-way clutch portion 50 on the left side thereof as viewed from the front side of this figure, the clutch portion 50 being composed of an engagement cylindrical surface 5a formed at an inner periphery of the first outer ring 5, an engagement cam-surface 7a formed at an outer periphery of the first inner ring 7, a retainer 22, coil springs 21, and the first engagement rollers 23.

The first one-way clutch 1 further includes a plurality of first balls 27 and a retainer 26. The first balls 27 retained by the retainer 26 are circumferentially disposed at fixed intervals between a raceway surface 5b with a circular arc shape in section, which is formed adjacent the engagement cylindrical surface 5a of the first outer ring 5, and a raceway surface 7b with a circular arc shape in section, which is formed adjacent the engagement cam-surface 7a of the first inner ring 7. The raceway surface 5b of the first outer ring 5, the raceway surface 7b of the first inner ring 7, the retainer 26, and the first balls 27 form a deep groove ball bearing portion 55.

An axially opened annular recess 67 is provided at the inner periphery of the first inner ring 7 and at a deep-groove-ball-bearing-portion-55-side end portion of the first inner ring 7 of the first one-way clutch 1.

Figure 3:
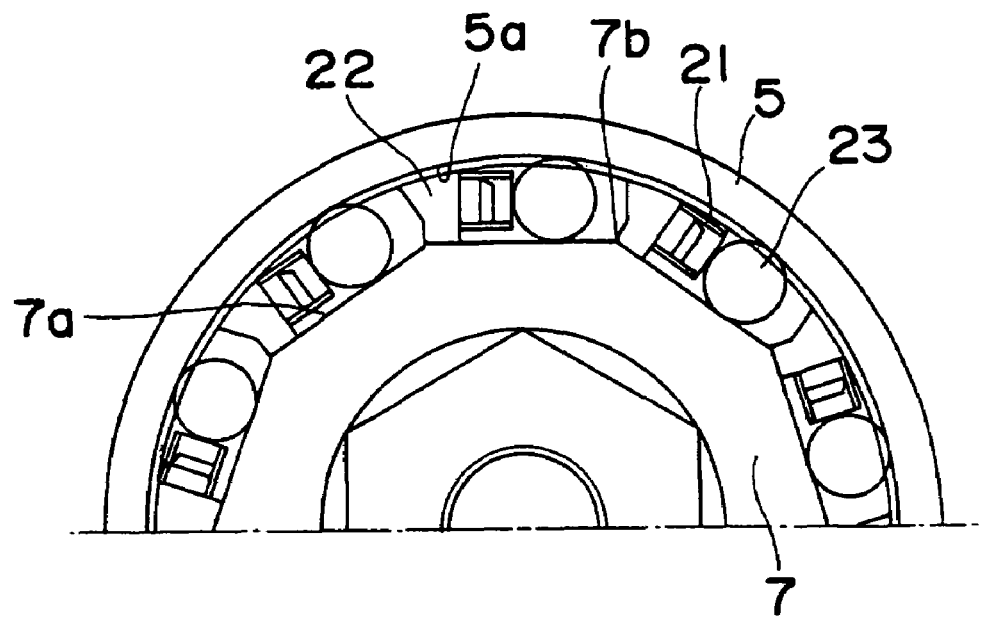
FIG. 3 is a cross section in a radial direction of a one-way clutch portion of the first one-way clutch.

FIG. 3 is a sectional view in a radial direction of the one-way clutch portion 50 of the first one-way clutch 1. The engagement cam-surface 7a of the one-way clutch portion 50 at the outer periphery of the first inner ring 7 has a regular polygonal shape in section, as shown in FIG. 3. Pillar portions that connect two annular frames of the retainer 22 are fitted at apex portions 7b of the engagement cam-surface 7a. The first engagement rollers 23 disposed in pockets of the retainer 22 are urged in one direction by the associated coil springs 21.

On the other hand, as shown in FIG. 2, the second one-way clutch 2 has a one-way clutch portion 60 on the right side thereof as viewed from the front side of this figure, the clutch portion 60 being composed of an engagement cam-surface 14a formed at an inner periphery of the second outer ring 14, an engagement cylindrical surface 15a formed at an outer periphery of the second inner ring 15, coil springs not shown, a retainer 37, and second engagement rollers 38.

The second one-way clutch 2 further includes a plurality of second balls 40 and a retainer 39. The second balls 40 retained by the retainer 39 are circumferentially disposed at fixed intervals between a raceway surface 14b with a circular arc shape in section, which is formed adjacent the engagement cam-surface 14a of the second outer ring 14, and a raceway surface 15b with a circular arc shape in section, which is formed adjacent the engagement cylindrical surface 15a of the second inner ring 15. The raceway surface 14b of the second outer ring 14, the raceway surface 15b of the second inner ring 15, the retainer 39, and the second balls 40 form a deep groove ball bearing portion 65 of the second one-way clutch 2.

As shown in FIG. 2, an end portion on the side of the deep groove ball bearing portion 65 of the second outer ring 14 is disposed in the annular recess 67 formed at the inner periphery of the deep-groove-ball-bearing-portion-55-side end portion of the first inner ring 7. The second inner ring 15 is fixed by a bottom surface of the recess 67 of the first inner ring 7 and a riser portion 6a of the rotating shaft 6.

Figure 4:
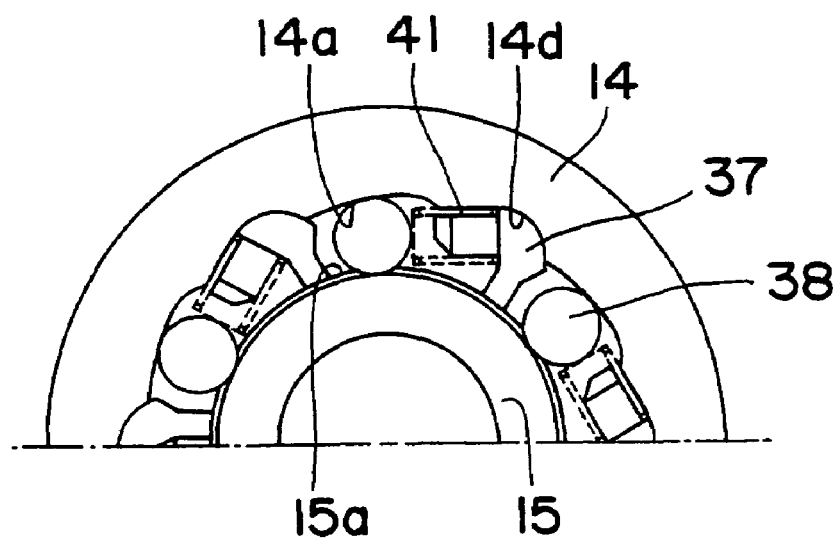
FIG. 4 is a cross section in a radial direction of a one-way clutch portion of the second one-way clutch.

FIG. 4 is a sectional view in a radial direction of the one-way clutch portion 60 of the second one-way clutch 2. As shown in FIG. 4, the engagement cam-surface 14a of the one-way clutch portion 60 at the inner periphery of the second outer ring 14 has substantially planar portions at which the second engagement rollers 38 contact the engagement cam-surface 14a. Pillar portions of the retainer 37 connecting opposed annular frames of the retainer 37 are fitted in corresponding annular grooves 14d with a generally circular arc shape in section, which grooves are provided in the inner peripheral surface of the second outer ring 14 circumferentially at fixed intervals. The second engagement rollers 38 individually disposed in respective wedge-shaped pockets of the retainer 37 are urged in one direction by coil springs 41.

Reference numerals 91, 92, 93, 94 of FIG. 2 indicate seal members. The seal members 91, 92 seal in grease between the first outer ring 5 and the first inner ring 7, while the seal members 93, 94 seal in grease between the second outer ring 14 and the second inner ring 15.

In the power transmission device with the above construction, while the engine is in operation, a rotational power of the engine is transmitted to the pulley 3 shown in FIG. 1 via the belt that is not shown. The rotational power transmitted to the pulley 3 is then transmitted to the first outer ring 5 of the first one-way clutch 1 via the first power-transmitting member 4, so that the first outer ring is rotated. Then, with the first engagement rollers 23 of the one-way clutch portion 50 of the first one-way clutch 1 engaged with the engagement cylindrical surface 5a of the first outer ring 5 and the engagement cam-surface 7a of the first inner ring 7 shown in FIG. 2, the first one-way clutch 1 is brought into an engaged, or on state. Consequently, the rotational power of the engine is transmitted from the first outer ring 5 to the first inner ring 7. Thereafter, the rotational power of the engine transmitted to the first inner ring 7 is transmitted to the rotating shaft 6, so that the compressor that is not shown is driven. While the engine is operating, the rotor 11 of the motor 10 is under suspension, i.e., in a non-operational state, when the second engagement rollers 38 of the second one-way clutch 2 are in a loosely fitted state between the engagement cam-surface 14a of the stationary second outer ring 14 and the engagement cylindrical surface 15a of the second inner ring 15 rotating forward, namely, the second one-way clutch 2 is in a disengaged state, or off state.

On the other hand, when the engine is stopped such as at the idling stop, the engine-driven pulley 3 is stopped, and the first engagement rollers 23 are brought into a loosely fitted state between the engagement cylindrical surface 5a of the first outer ring 5 that is stationary and the engagement cam-surface 7a of the first inner ring 7 that is rotating forward, namely the first one-way clutch 1 is brought into a disengaged state. At this time, the motor 10 is driven to rotate the rotor 11. The rotational power of the rotor 11 is transmitted to the second outer ring 14 of the second one-way clutch 2, so that the second outer ring 14 is rotated in a forward direction. Then, with the second engagement rollers 38 of the one-way clutch portion 60 of the second one-way clutch 2 engaged with the engagement cam-surface 14a of the second outer ring 14 and the engagement cylindrical surface 15a of the second inner ring 15, the second one-way clutch 2 is brought into an engaged state, or on state. Consequently, the rotational power is transmitted from the second outer ring 14 to the second inner ring 15. Then, the rotational power of the rotor 11 transmitted to the second inner ring 15 is transmitted to the rotating shaft 6 and drives the compressor. While the individual one-way clutch portions 50, 60 of the one-way clutches 1, 2 are in a disengaged state, the deep groove ball bearing portions 55, 65 of the first and second one-way clutches 1, 2 bear radial loads applied to the one-way clutches 1, 2, respectively, to thereby secure load resistance and durability of their respective associated one-way clutch portions 50, 60 of the one-way clutches 1, 2.

According to the power transmission device of the above embodiment, the first one-way clutch 1 is used for transmitting the rotational power of the pulley 3 to the rotating shaft 6, while the second one-way clutch 2 is used for transmitting the rotational power of the rotor 11 of the motor 10 to the rotating shaft 6. Therefore, the power transmission device of the above embodiment dispenses with an electromagnetic clutch and a control part that controls the on-off operation of the electromagnetic clutch, which are required by the conventional power transmission device. Therefore, the power transmission device can be made simple in structure as well as compact.

According to the power transmission device of the embodiment, the second one-way clutch 2 is made as a so-called outer cam type one-way clutch in which the engagement cam-surface 14a is formed at the inner periphery of the outer ring 14 and the engagement cylindrical surface 15a is formed at the outer periphery of the inner ring 15. Thus, a radius of the engagement cylindrical surface 15a of the second one-way clutch 2 is reduced, as compared with the case where the second one-way clutch 2 is made as a so-called inner cam type one-way clutch in which the engagement cam-surface is formed at the outer periphery of the inner ring, and the engagement cylindrical surface is formed at the inner periphery of the outer ring. That is, when the second one-way clutch 2 is in a disengaged state, and the second engagement rollers 38 are thus in an idling state, a relative circumferential speed between the engagement cylindrical surface 15a of the second one-way clutch 2 and the second engagement rollers 38, which speed is proportional to the above-mentioned radius, can be reduced by decreasing the radius. During the time in which the engine is operating, in most of which time the rotational speed of the pulley 3 is relatively higher than that of the rotating shaft 6, the second engagement rollers 38 are in a sliding state on the engagement cylindrical surface 15a. Therefore, reducing the relative circumferential speed of the engagement cylindrical surface 15a of the second one-way clutch 2 with respect to the second engagement rollers 38, as mentioned above, contributes to the reduction of the heat release value due to friction between the engagement cylindrical surface 15a and the second engagement rollers 38. Consequently, the lifetime of grease sealed in between the outer ring 14 and inner ring 15 of the second one-way clutch 2 can be prolonged.

Further, according to the power transmission device of the embodiment, the first one-way clutch 1 is made as a so-called inner cam type one-way clutch in which the engagement cam-surface 7a is formed at the outer periphery of the inner ring 7, and the engagement cylindrical surface 5a is formed at the inner periphery of the outer ring 5. When the first one-way clutch 1 is in an engaged state and the first engagement rollers 23 are engaged between the engagement cylindrical surface 5a of the inner periphery of the outer ring 5 and the engagement cam-surface 7a of the outer periphery of the inner ring 7, engagement performance between the first engagement rollers 23 and each of the engagement cylindrical surface 5a and the engagement cam-surface 7a is able to be stabilized, compared with the case where the first one-way clutch 1 is made as an outer cam type one-way clutch in which the engagement cam-surface is formed at the inner periphery of the outer ring and the engagement cylindrical surface is formed at the outer periphery of the inner ring. That is, the engagement cylindrical surface 5a is formed at the inner periphery of the outer ring 5 such that the inner periphery of the outer ring 5 is curved, or concave radially outwardly. Thus, the engagement performance between the engagement cylindrical surface 5a of the outer ring 5 that is a concave surface and the surfaces of the first engagement rollers 23 that are convex surfaces is improved, compared with the case where the engagement cam-surface is formed at the inner periphery of the outer ring so that the inner periphery of the outer ring is made substantially planar. Therefore, during the time in which the engine is operating, in most of which time the rotational speed of the pulley 3 is relatively higher than that of the rotating shaft 6, even if the pulley 3 is rotated at a high speed and the outer ring 5 of the first one-way clutch 1 is rotated at a high speed accordingly, the first engagement rollers 23 are prevented from displacement from the engaged positions with the outer ring, so that the rotational power of the pulley 3 is surely transmitted to the rotating shaft 6.

According to the power transmission device of the above embodiment, the deep groove ball bearing portions 55, 65 are provided in the first and second one-way clutches 1, 2. Thus, when either the first or the second one-way clutch portion 50, 60 of the first or the second one-way clutch 1, 2 is in a disengaged state, the associated deep groove ball bearing portion 55 or 65 bear radial loads applied to the associated one-way clutch portion 50 or 60 of the first or second one-way clutch 1, 2. Therefore, load resistance and durability of the one-way clutch portions 50, 60 of the first and second one-way clutch 1, 2 are favorably secured.

In the power transmission device of the above embodiment, the first power-transmitting member 4 that transmits the rotational power of the pulley 3 to the first outer ring 5 of the first one-way clutch 1 is provided between the pulley 3 and the first outer ring 5 of the first one-way clutch 1. Alternatively, omitting the first power-transmitting member, the rotational power of the pulley may directly be transmitted to the outer ring of the first one-way clutch. In the power transmission device of the above embodiment, the yoke 12 of the rotor 11 is directly connected to the second outer ring 14 of the second one-way clutch 2, so that the rotational power of the rotor 11 is directly transmitted to the second outer ring 14. Alternatively, an additional power-transmitting member may be inserted between the rotor and the second outer ring of the second one-way clutch so that the rotational power of the rotor is transmitted to the second outer ring of the second one-way clutch via the additional power transmitting member.

In the power transmission device of the above embodiment, the deep groove ball bearing portions 55, 65 are individually provided in the first one-way clutch 1 and the second one-way clutch 2. According to the present invention, either or both of the deep groove ball bearing portions 55, 65 may be omitted.

In the power transmission device of the above embodiment, the engagement cylindrical surface 5a is formed on the inner peripheral surface of the first outer ring 5 of the first one-way clutch 1 that transmits the rotational power of the engine-driven pulley 3 to the rotating shaft 6 that drives the compressor, and the engagement cam-surface 7a is formed on the outer periphery of the first inner ring 7, whereby the first one-way clutch 1 is made as the so-called inner cam type one-way clutch using the engagement rollers as the engagement members. The first one-way clutch may also be a sprag clutch using sprags as the engagement members.

In the power transmission device of the above embodiment, the deep groove ball bearing portion 55 of the first one-way clutch 1 is disposed in the right-hand side location of the first one-way clutch 1 in FIG. 2, but may be disposed in a left-hand side location of the first one-way clutch in FIG. 2. Further, the deep groove ball bearing portion 65 of the second one-way clutch 2 is disposed in the left side location of the second one-way clutch 2 in FIG. 2, but may be disposed in a right-hand side location of the second one-way clutch 2 in FIG. 2.

In the power transmission device of the above embodiment, the deep groove ball bearing portions are provided in the first and second one-way clutches 1, 2. Instead of such a deep groove ball bearing portion, an angular ball bearing portion or a four-point contact ball bearing portion may be provided in at least one of the first and second one-way clutches.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power transmission device comprising:
a pulley to which a rotational power is transmitted via a belt;
a motor having a rotor;
a shaft to which a rotational power of the pulley and a rotational power of the rotor are transmitted;
a first one-way clutch including an inner ring, an outer ring, and engagement members disposed between the inner ring and the outer ring, the first one-way clutch transmitting the rotational power of the pulley to the shaft when a rotational speed of the pulley is relatively higher than that of the rotating shaft; and
a second one-way clutch including an inner ring, an outer ring, and engagement members disposed between the inner ring and the outer ring, the second one-way clutch transmitting the rotational power of the rotor to the shaft when the rotational speed of the rotor is relatively higher than that of the shaft;
wherein, in the second one-way clutch,
the inner ring has an engagement cylindrical surface in an outer periphery thereof and is rotatable together with the shaft;
the outer ring has an engagement cam-surface in an inner periphery thereof and is rotatable together with the rotor; and
the engagement members are engagement rollers disposed between the engagement cylindrical surface of the inner ring and the engagement cam-surface of the outer ring;
wherein, in the first one-way clutch,
the inner ring has an engagement cam-surface in an outer periphery thereof and is rotatable together with a shaft;
the outer ring has an engagement cylindrical surface in an inner periphery thereof and is rotatable together with the pulley; and
the engagement members are engagement rollers disposed between the engagement cam-surface of the inner ring and the engagement cylindrical surface of the outer ring.

2. The power transmission device according to claim 1, wherein, in at least one of the first one-way clutch and the second one-way clutch, the inner ring and the outer ring are provided with raceway surfaces adjacent the engagement surfaces of the inner ring and the outer ring and balls are disposed between these raceway surfaces so that a ball bearing portion is provided.

3. The power transmission device according to claim 1, wherein, in at least one of the first one-way clutch and the second one-way clutch, the inner ring and the outer ring are provided with raceway surfaces adjacent the engagement surfaces of the inner ring and the outer ring and balls are disposed between these raceway surfaces so that a ball bearing portion is provided.

* * * * *